United States Patent
Omichi et al.

(10) Patent No.: US 10,215,133 B2
(45) Date of Patent: Feb. 26, 2019

(54) CANISTER

(71) Applicant: MAHLE FILTER SYSTEMS JAPAN CORPORATION, Tokyo (JP)

(72) Inventors: Junpei Omichi, Kawagoe (JP); Masaki Kawada, Sayama (JP); Yoichi Ikeda, Saitama (JP)

(73) Assignee: MAHLE FILTER SYSTEMS JAPAN CORPORATION, Tokyo (JP)

( * ) Notice: Subject to any disclaimer, the term of this patent is extended or adjusted under 35 U.S.C. 154(b) by 135 days.

(21) Appl. No.: 15/339,004

(22) Filed: Oct. 31, 2016

(65) Prior Publication Data

US 2017/0175682 A1     Jun. 22, 2017

(30) Foreign Application Priority Data

Dec. 17, 2015  (JP) ................... 2015-245736

(51) Int. Cl.
   *F02M 25/08*    (2006.01)
   *B01D 53/04*    (2006.01)

(52) U.S. Cl.
   CPC ..... *F02M 25/0854* (2013.01); *B01D 53/0407* (2013.01); *B01D 2253/102* (2013.01); *B01D 2259/4516* (2013.01)

(58) Field of Classification Search
   CPC .......... B01D 53/0407; B01D 2253/102; B01D 2259/4516; F02M 25/0854
   USPC .............. 96/131, 139, 152; 95/146; 123/519
   See application file for complete search history.

(56) References Cited

U.S. PATENT DOCUMENTS

| | | | | |
|---|---|---|---|---|
| 4,306,894 A | * | 12/1981 | Fukami | B01D 53/0446 123/519 |
| 4,338,106 A | * | 7/1982 | Mizuno | F02M 25/0854 123/519 |
| 4,448,594 A | * | 5/1984 | Kozawa | H01L 21/22 123/519 |
| 4,507,132 A | * | 3/1985 | Yoshida | F02M 25/0854 123/519 |
| 6,503,301 B2 | * | 1/2003 | Uchino | B01D 53/0415 123/519 |

(Continued)

FOREIGN PATENT DOCUMENTS

JP      2014-234717 A      12/2014

*Primary Examiner* — Frank M Lawrence, Jr.
(74) *Attorney, Agent, or Firm* — Foley & Lardner LLP

(57) ABSTRACT

A canister is provided with a flange for partitioning part of one axial end of an adsorption material chamber and having a first cylindrical portion protruding toward the adsorption material chamber for defining a space communicating with a purge port, a second cylindrical portion extending toward a first axial end portion of a case for defining a diffusion chamber communicating with a charge port, and orifices for communicating the adsorption material chamber with the diffusion chamber. Also provided are a first partition wall positioned close to a top end of the first cylindrical portion and having an annularly-shaped orifice, and a second partition wall axially spaced apart from the first partition wall toward a second axial end portion and having communication holes. These partition walls cooperate with each other such that a second diffusion chamber not charged with an adsorption material is defined between them, for optimal charge-gas conversion-and-diffusion.

6 Claims, 5 Drawing Sheets

(56) References Cited

U.S. PATENT DOCUMENTS

| | | | | |
|---|---|---|---|---|
| 6,524,374 B2* | 2/2003 | Moriyama | ......... | B01D 53/0415 123/519 |
| 7,175,698 B2* | 2/2007 | Matsuura | ........... | B01D 53/0415 96/134 |
| 7,294,179 B2* | 11/2007 | Kim | ................... | B01D 53/0415 123/519 |
| 2014/0060497 A1* | 3/2014 | Akiyama | ........... | F02M 25/0854 123/519 |
| 2014/0352541 A1* | 12/2014 | Omichi | .............. | F02M 25/0854 96/152 |

* cited by examiner

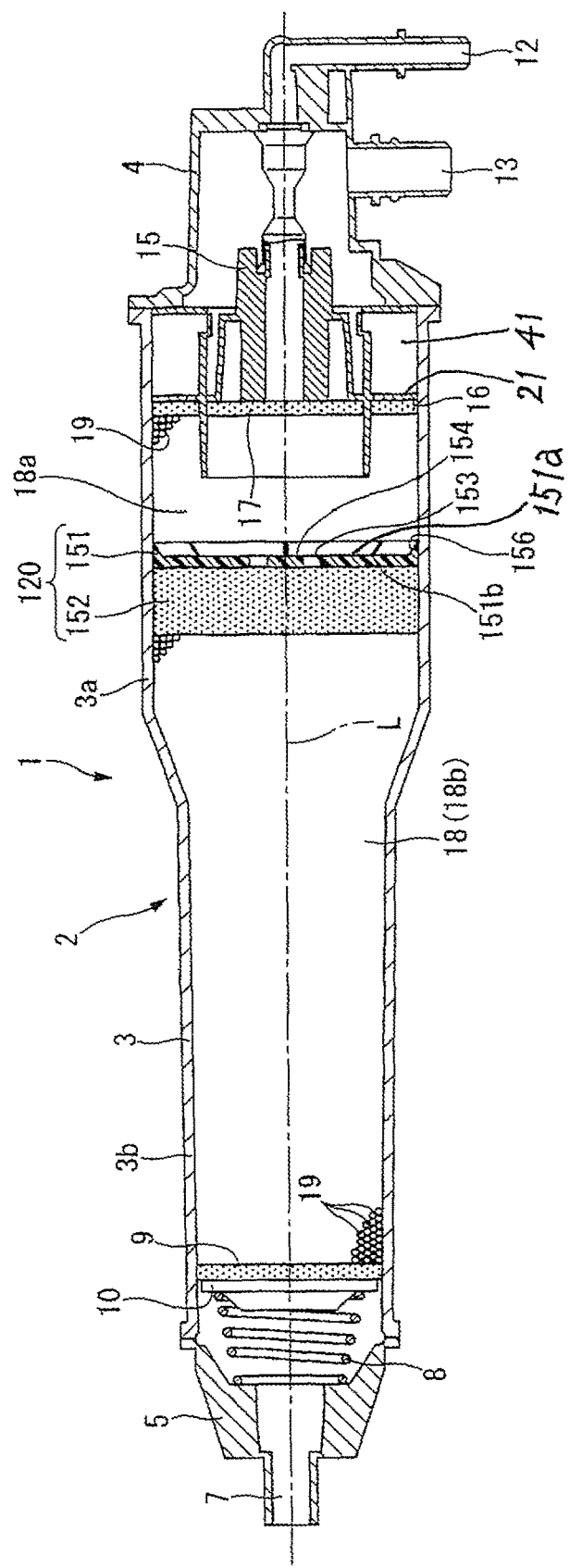

CANISTER

TECHNICAL FIELD

The present invention relates to a canister used for an evaporative fuel processing apparatus of an automotive vehicle, and specifically to a canister having a cylindrically shaped, axially-elongated canister case structured to permit gas to flow in its longitudinal direction.

BACKGROUND ART

As is generally known, an automotive vehicle, which uses an internal combustion engine, is equipped with an evaporative fuel processing apparatus mainly constructed by a canister for suppressing evaporative fuel generated within a fuel tank from being discharged into the atmosphere. The canister has a canister case charged with an adsorption material such as activated charcoal or carbon. The canister is configured to temporarily adsorb and trap evaporative fuel generated from within the fuel tank by the adsorption material in a vehicle stopped state where the internal combustion engine is stopped, and allow fuel components from the adsorption material to be desorbed by atmospheric air introduced through a drain port (also called "atmospheric port") during operation of the engine, and purge the air containing the fuel vapor desorbed from the adsorption material (the activated carbon) into the intake system of the engine.

One such canister has been disclosed in patent document 1 (JP2014-234717 corresponding to United States patent application publication No. US 2014/0352541 A1). The canister, as disclosed in the patent document 1, is equipped with a laterally-curved purge port configured to extend from the center position of one axial end of the cylindrical case and located on the center line (the axis) of the case, and a charge port connected to a sidewall surface of the one axial end of the case. Also provided at the one axial end of the case is a flange for partitioning a part of an adsorption material chamber. The flange is formed with a cylindrical portion protruding toward an adsorption material chamber. The flange is also formed with a plurality of circumferentially equidistant-spaced orifices, through which the adsorption material chamber and a diffusion chamber (this diffusion chamber is configured to communicate with the charge port) are communicated with each other. Evaporative fuel (charge gas) is introduced from the charge port into the diffusion chamber, and then guided into the adsorption material chamber by way of the plurality of orifices. The previously-noted cylindrical portion is provided to prevent the charge gas containing fuel components at high concentration from flowing directly toward the purge port without being adsorbed or trapped by the adsorption material.

SUMMARY OF THE INVENTION

However, with the configuration of the prior-art canister as disclosed in the above patent document 1 (JP2014-234717), during the charge phase of operation in which charging is advancing, the charge gas tends to flow substantially straight along the outer peripheral surface of the cylindrical portion. Thus, the prior-art canister structure has a drawback that it is difficult to flow or direct the charge gas toward the central section of the adsorption material chamber nearby the downstream end of the cylindrical portion. That is, a region of the central section of the adsorption material chamber nearby the downstream end of the cylindrical portion is not effectively utilized for fuel-vapor adsorption (charge-gas adsorption).

Therefore, it would be desirable to further improve a canister such that the ability to adsorb charge gas containing fuel components can be further enhanced.

Accordingly, it is an object of the invention to provide a further improved canister capable of exhibiting a greatly enhanced adsorption ability and more uniform adsorption-amount distribution during a charge phase of operation.

According to one aspect of the invention, a canister comprises a cylindrically shaped case whose inside is charged with an adsorption material, a charge port and a purge port both located at a first axial end portion of the case, a drain port located at a second axial end portion of the case, the second axial end portion being opposite to the first axial end portion in a longitudinal direction of the case, and an annularly shaped flange provided at the first axial end portion of the case for partitioning an outer peripheral section of one axial end of an adsorption material chamber defined in the case, the flange having a first cylindrical portion configured to protrude from an inner periphery of the flange toward the second axial end portion and concentric with the case for defining a specified space corresponding to a central section of the case and communicating with the purge port, a second cylindrical portion configured to extend from the inner periphery of the flange toward the first axial end portion and concentric with the case for defining an annular diffusion chamber communicating with the charge port in cooperation with the case, and a plurality of orifices formed in the flange for communicating the adsorption material chamber with the annular diffusion chamber through the plurality of orifices, the improvement which comprises a first partition wall installed in the adsorption material chamber and positioned close to a top end of the first cylindrical portion and having an orifice formed at a central section of the first partition wall, and a second partition wall positioned to be axially spaced apart from the first partition wall toward the second axial end portion and having a plurality of communication holes formed around an entire surface of the second partition wall, the second partition wall being structured to cooperate with the first partition wall such that a second diffusion chamber not charged with an adsorption material is defined between them.

With the previously-discussed configuration (that is, in one aspect of the invention), charge gas, introduced through the plurality of orifices of the flange into the adsorption material chamber, can converge toward the orifice of the first partition wall, and thus charging tends to advance even radially in cross section perpendicular to the longitudinal charge-gas flow stream. Hence, a specified region, substantially corresponding to the central section of the upstream-side adsorption material chamber upstream of the first partition wall, can be effectively utilized for fuel-vapor adsorption (charge-gas adsorption). Furthermore, the charge gas can be re-diffused by means of the second diffusion chamber. Hence, within the downstream-side adsorption material chamber downstream of the second partition wall, charging tends to advance around the entire surface of the cross section.

Preferably, the case is configured to have a small-diameter part on a side of the drain port (i.e., on the side of the second axial end portion) and a large-diameter part on a side of the charge port (i.e., on the side of the first axial end portion), and the first partition wall and the second partition wall are both positioned in the large-diameter part of the case. More preferably, the orifice of the first partition wall is formed into a substantially annular shape.

According to another aspect of the invention, a canister comprises a cylindrically shaped case whose inside is charged with an adsorption material, a charge port and a purge port both located at a first axial end portion of the case, a drain port located at a second axial end portion of the case, the second axial end portion being opposite to the first axial end portion in a longitudinal direction of the case, and an annularly shaped flange provided at the first axial end portion of the case for partitioning an outer peripheral section of one axial end of an adsorption material chamber defined in the case, the flange having a first cylindrical portion configured to protrude from an inner periphery of the flange toward the second axial end portion and concentric with the case for defining a specified space corresponding to a central section of the case and communicating with the purge port, a second cylindrical portion configured to extend from the inner periphery of the flange toward the first axial end portion and concentric with the case for defining an annular diffusion chamber communicating with the charge port in cooperation with the case, and a plurality of orifices formed in the flange for communicating the adsorption material chamber with the annular diffusion chamber through the plurality of orifices, the improvement which comprises a partition wall installed in the adsorption material chamber and positioned close to a top end of the first cylindrical portion and having an orifice formed at a central section of the partition wall, and a gas-permeable member overlaid on a surface of the partition wall, facing the second axial end portion, the gas-permeable member having a prescribed longitudinal length in the longitudinal direction of the case.

With the previously-discussed configuration (that is, in another aspect of the invention), charge gas, introduced through the plurality of orifices of the flange into the adsorption material chamber, can converge toward the orifice of the partition wall, and thus charging tends to advance even radially in cross section perpendicular to the longitudinal charge-gas flow stream. Hence, a specified region, substantially corresponding to the central section of the upstream-side adsorption material chamber upstream of the partition wall, can be effectively utilized for fuel-vapor adsorption (charge-gas adsorption). Furthermore, the charge gas can be re-diffused by way of the gas-permeable member. Hence, within the downstream-side adsorption material chamber downstream of the gas-permeable member, charging tends to advance around the entire surface of the cross section.

As appreciated from the above, according to the invention, it is possible to remarkably reduce a region that cannot be effectively utilized for fuel-vapor adsorption (charge-gas adsorption) within the adsorption material chamber. Charging tends to more uniformly advance even radially in cross section perpendicular to the longitudinal charge-gas flow stream. Therefore, charging of evaporative fuel (charge gas) can be made, while effectively utilizing almost all of the adsorption material within the adsorption material chamber. Hence, during a charge phase of operation, it is possible to greatly enhance the ability of the canister to adsorb charge gas containing fuel components. The improved canister of the invention is effective in particular, during refueling of the vehicle, in which quick charging is carried out.

The other objects and features of this invention will become understood from the following description with reference to the accompanying drawings.

BRIEF DESCRIPTION OF THE DRAWINGS

FIG. 6 is a longitudinal cross-sectional view illustrating a second embodiment of a canister according to the invention.

DESCRIPTION OF THE PREFERRED EMBODIMENTS

The detailed description of embodiments of a canister according to the invention will be given with reference to the accompanying drawings.

Figure 1:
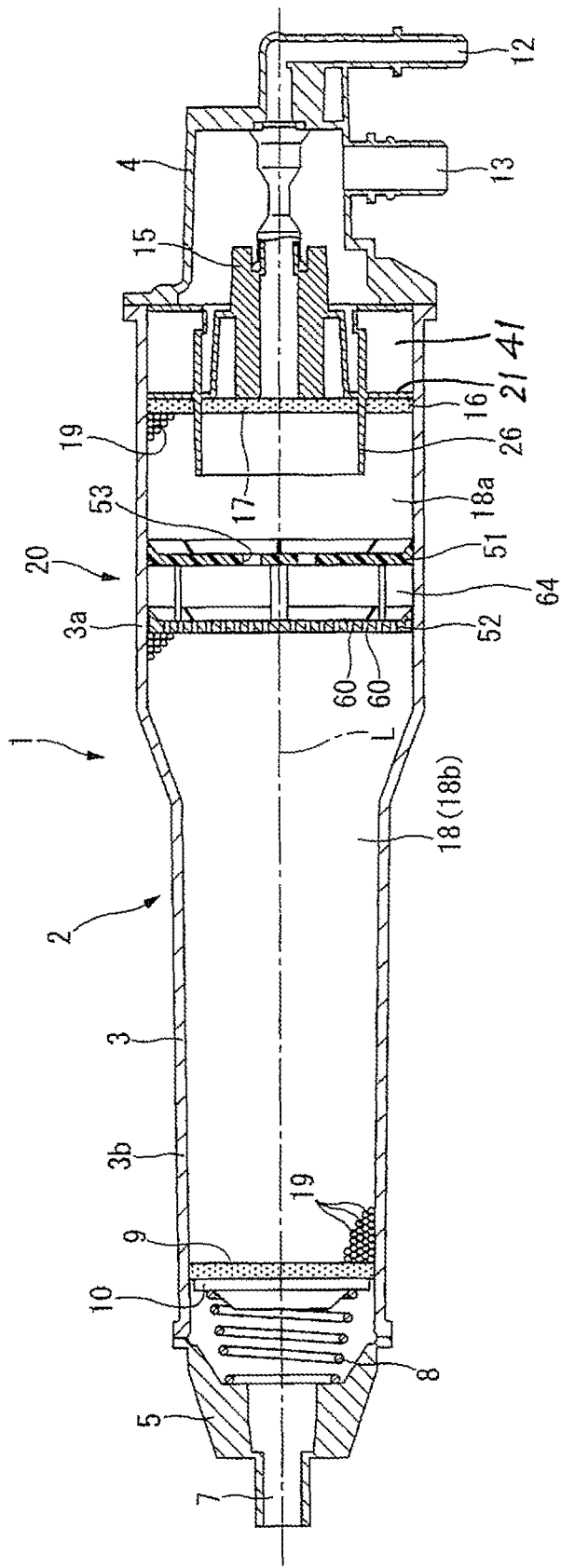
FIG. 1 is a longitudinal cross-sectional view illustrating a first embodiment of a canister according to the invention.

Referring now to the drawings, particularly to FIG. 1, there is shown the longitudinal cross-section of a canister of the first embodiment. Canister 1 has a synthetic-resin case 2. The case 2 is mainly constructed by a cylindrical-hollow main body (housing) 3 having a complete circular cross section, a charge/purge-side end cover 4, and a drain-side end cover 5. The main body 3 is comprised of a large-diameter part 3a and a small-diameter part 3b. Both ends of main body 3 are formed as an opening end on the side of large-diameter part 3a and an opening end on the side of small-diameter part 3b, respectively. Charge/purge-side end cover 4 is attached to the opening end of large-diameter part 3a, while drain-side end cover 5 is attached to the opening end of small-diameter part 3b.

The drain-side end cover 5 is formed at its central portion integral with a drain port 7 configured to axially extend along the center line L (the axis) of main body 3. The drain-side end cover 5 serves as a support for supporting a screen member 9 having a gas permeability and a grid plate 10 via a coiled spring 8. On the other hand, the charge/purge-side end cover 4 is equipped with a laterally-curved purge port 12 configured to extend from the center position of charge/purge-side end cover 4 and located on the center line L of main body 3 and a charge port 13 connected to a sidewall surface of charge/purge-side end cover 4. A bulkhead 15, which is integrally formed of synthetic resin, is also fitted or installed into the opening end of large-diameter part 3a of main body 3, which opening end is covered by the charge/purge-side end cover 4. A screen member 16 and a screen member 17, each of which has a gas permeability, are installed at the inside end face of bulkhead 15. The volume of the internal space defined between the screen-member pair 16, 17 and the drain-port side screen member 9 is configured as an adsorption material chamber 18. The inside of adsorption material chamber 18 is charged with granular activated carbon, serving as an adsorption material 19. The previously-discussed coiled spring 8, serving as a support for the screen member 9 and the grid plate 10, also serves to retain or hold the activated carbon particles (adsorption material 19) in an appropriately compressed state. Furthermore, a charge-gas conversion-and-diffusion mechanism 20 (described later) is installed in the large-diameter part 3*a* of main body 3.

As is generally known, the aforementioned charge port 13 is connected to the upper gaseous space of a fuel tank (not shown) of an automotive vehicle. The aforementioned purge port 12 is connected to an intake system (not shown) of an internal combustion engine. On the other hand, the aforementioned drain port 7 is directly opened into the atmosphere, or opened into the atmosphere through the use of an additional piping/valve device or equipment. For instance, in a vehicle stopped state where the engine is stopped or during refueling of the vehicle, fuel vapor (gas containing evaporative fuel), generated within the fuel tank, is introduced through the charge port 13 into the canister 1, and then the introduced fuel vapor flows straight within the main body 3 along the center line L (the axis) of main body 3 in the longitudinal direction of the case 2. During this phase in which the fuel vapor is flowing within the main body 3 along the center line L, the fuel vapor is adsorbed by the adsorption material 19 (activated carbon particles) installed in the adsorption material chamber 18. Then, during operation of the engine, atmospheric air (fresh air) is introduced or drawn through the drain port 7 into the canister 1 by vacuum produced in the intake system. Hence, the introduced atmospheric air removes, desorbs, or purges the fuel components, temporarily adsorbed as discussed previously, from the adsorption material 19 (activated carbon particles). Then, the desorbed fuel components, that is, the purge gas flows from the purge port 12 into the intake system of the internal combustion engine, and thus the purge gas is finally burned in the internal combustion engine.

Figure 2:
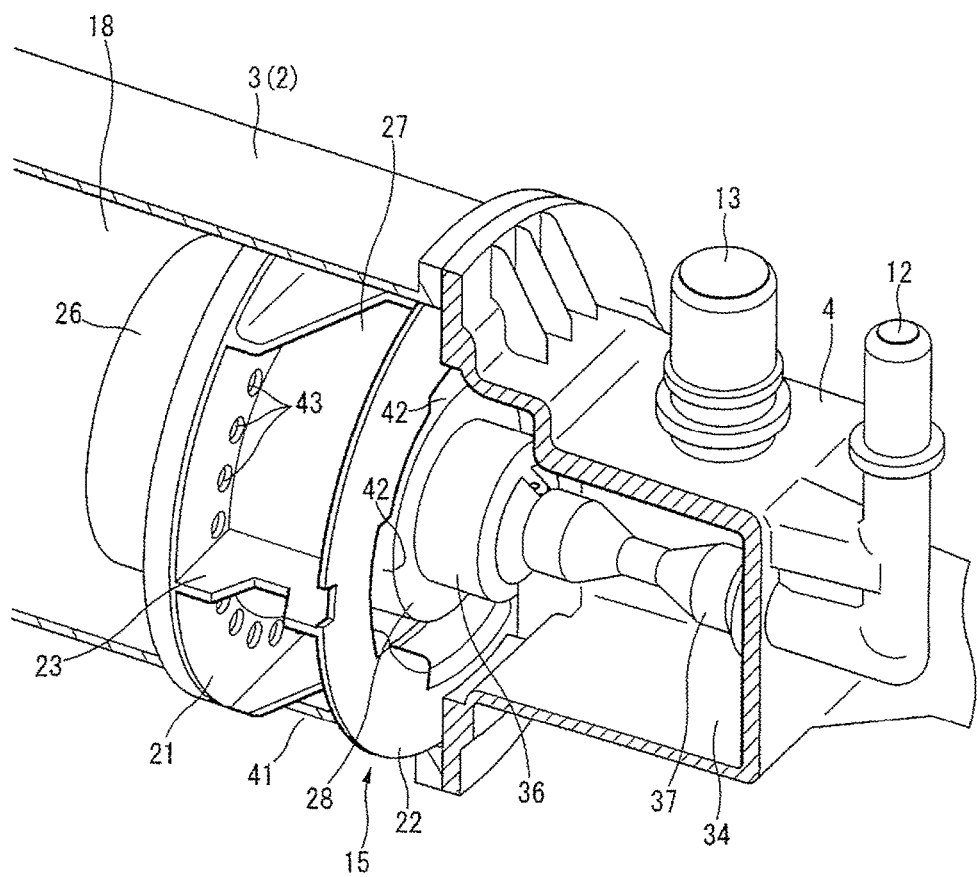
FIG. 2 is an enlarged perspective view illustrating one axial end of the canister of the first embodiment.
Figure 3:
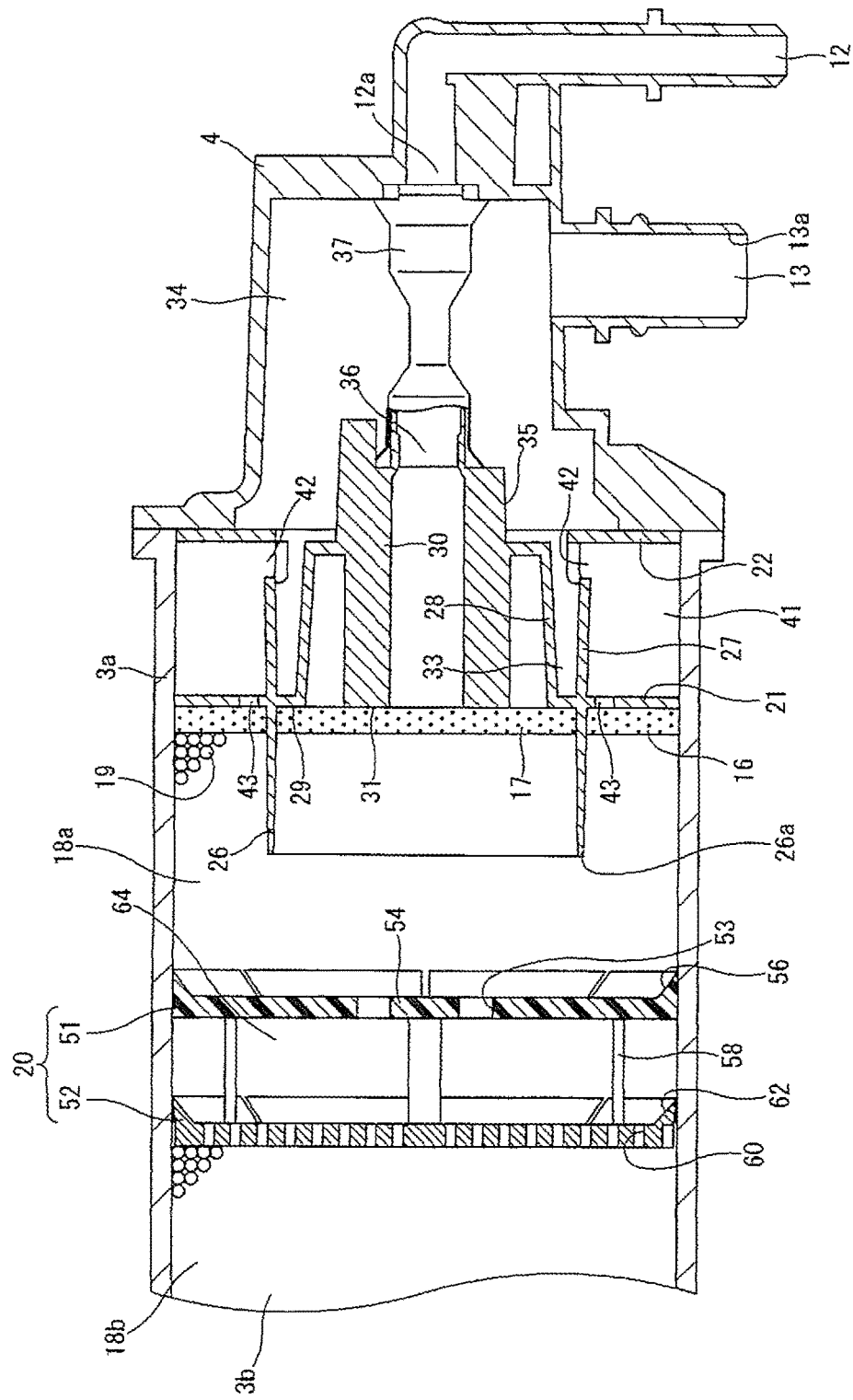
FIG. 3 is an enlarged longitudinal cross-sectional view illustrating the one axial end of the canister of the first embodiment.

As clearly shown in FIGS. 2-3, bulkhead 15 has an annular first flange 21 provided for partitioning a part (an outer peripheral section) of one axial end of the adsorption material chamber 18 and an annular second flange 22 located at the opening end of large-diameter part 3*a* of main body 3. These two annular disk-shaped flanges 21-22 are formed integral with each other via a plurality of radially-arrayed ribs 23 (see FIG. 2). As best seen in FIG. 3, the first flange 21 and the second flange 22 are configured as two parallel flanges axially opposed to each other. Also, in order to ensure a required volume (i.e., a required diffusion capacity) for a diffusion chamber 41 (described later), the first flange 21 and the second flange 22 are axially spaced apart from each other by a prescribed axial distance. The first flange 21 is integrally formed at its inner peripheral edge with a first cylindrical portion 26 and a second cylindrical portion 27. The first cylindrical portion 26 is configured to protrude from the inner periphery of the first flange toward the adsorption material chamber 18, whereas the second cylindrical portion 27 is configured to extend from the inner periphery of the first flange to the direction opposite to the first cylindrical portion 26. The first cylindrical portion 26 and the second cylindrical portion 27 are dimensioned to be equal to each other in outside diameter and in inside diameter. The first cylindrical portion 26 is configured to partition a part of the adsorption material 19 of adsorption material chamber 18 into an activated-carbon area of the outer peripheral side (i.e., the side of charge port 13) and an activated-carbon area of the inner peripheral side (i.e., the side of purge port 12). Thus, the first cylindrical portion 26 functions to prevent the charge gas introduced from the charge port 13 into the adsorption material chamber 18 and containing fuel components at high concentration from flowing directly toward the purge port 12 without being adsorbed or trapped by the adsorption material 19.

A third cylindrical portion 28 is further formed integral with the inner peripheral edge of the first flange 21, such that the third cylindrical portion 28 is concentrically arranged inside of the second cylindrical portion 27. As seen from the longitudinal cross-sectional view of FIG. 3, a plurality of radially-extending ribs 30 are formed integral with and inside of the third cylindrical portion 28, for supporting the screen member 17. As best seen in FIG. 3, the first cylindrical portion 26, the second cylindrical portion 27, and the third cylindrical portion 28 are all arranged concentrically with respect to the center line L (the axis) of the main body 3. The third cylindrical portion 28 is dimensioned to be smaller in diameter than each of the first cylindrical portion 26 and the second cylindrical portion 27. An annular clearance space 33 (see FIG. 3) is defined between the third cylindrical portion 28 and the second cylindrical portion 27. The annular clearance space 33 is opened to an internal space defined in the charge/purge-side end cover 4, that is, to a charge-gas chamber 34.

The end wall of the third cylindrical portion 28, facing the charge-gas chamber 34 of the charge/purge-side end cover 4, is further formed integral with a cup-shaped fourth cylindrical portion 35 dimensioned to be smaller in diameter than the third cylindrical portion 28. A purge outlet 36 is opened at the center of the end wall of the fourth cylindrical portion 35. The purge outlet 36 is connected through a connecting tube 37 (a separate member) to an inlet 12*a* of the purge port 12.

The annular diffusion chamber 41 is defined between the outer peripheral surface of the second cylindrical portion 27 and the inner peripheral surface of the large-diameter part 3*a* of main body 3, such that both axial ends of the diffusion chamber 41 are partitioned by the first flange 21 and the second flange 22, respectively. A plurality of circumferentially cut-out windows (openings) 42 are partially formed in the inner peripheral edge of the second flange 22, corresponding to the junction that joins the second cylindrical portion 27 to the second flange 22, for communicating the diffusion chamber 41 with the charge-gas chamber 34 through the plurality of windows 42 (for instance, three windows 42 in the shown embodiment). These windows 42 are configured to serve as an auxiliary flow-restricting (flow-constricting) orifice part for converging the charge-gas flow toward a substantially center position of the downstream end of the charge-gas chamber 34 while restricting the charge-gas flow within the charge-gas chamber 34 and for guiding or directing the charge-gas flow to the diffusion chamber 41.

As shown in FIG. 3, the annularly shaped, first flange 21, serving as a partition that divides the diffusion chamber 41 from the adsorption material chamber 18, has a plurality of small circular orifices 43 formed in the first flange 21. The diffusion chamber 41 and the adsorption material chamber 18 are communicated with each other through the plurality of orifices 43. These orifices 43 are circumferentially equidistant-spaced with each other and arranged on a single concentric circle concentric to concentric circles of the first cylindrical portion 26, the second cylindrical portion 27, and the large-diameter part 3*a* of main body 3, and located closer to and outside of the roots of the first cylindrical portion 26 and the second cylindrical portion 27.

Gas (called "charge gas" in the shown embodiment) containing evaporative fuel, generated within the fuel tank, is introduced through the charge port 13 into the charge-gas chamber 34, and then the introduced charge gas enters through the flow-restricting windows 42 into the diffusion chamber 41. Thereafter, the charge gas is further guided from the diffusion chamber 41 through the plurality of orifices 43 of the first flange 21 into the adsorption material chamber 18. During the charge phase of operation, first of all, the charge gas flows through the charge port 13 into the charge-gas chamber 34 in a radial direction perpendicular to the center line L (the axis) of main body 3. However, as a result of repetitions of expansion of charge gas within the charge-gas chamber 34, contraction (constriction) of charge gas through the windows 42, re-diffusion of charge gas within the diffusion chamber 41, contraction (constriction) of charge gas through the plurality of orifices 43, and expansion of charge gas within the adsorption material chamber 18, the flow-velocity vector of the radial gas flow of charge gas introduced through the charge port 13 can be eliminated or vanished. Thus, the charge gas flows through the plurality of orifices 43 into the adsorption material chamber 18 (an upstream-side adsorption material chamber 18a described later) without being partially biased. The charge gas, introduced through the plurality of orifices 43 into the upstream-side adsorption material chamber 18a, flows along the outer peripheral surface of the first cylindrical portion 26 in the form of individual narrow flow streams, in other words, in the form of a totally cylindrical flow stream.

In contrast, during a desorption phase, that is, during a purge phase, purge gas, which is a mixture of atmospheric air (fresh air) introduced or drawn through the drain port 7 and fuel components, tends to converge within the first cylindrical portion 26, substantially corresponding to the center of main body 3. The purge gas further flows through the third cylindrical portion 28, the fourth cylindrical portion 35, and the connecting tube 37 into the purge port 12. Thereafter, the purge gas flows from the purge port 12 into the intake system of the internal combustion engine, and thus the purge gas is finally burned in the internal combustion engine.

Figure 4:
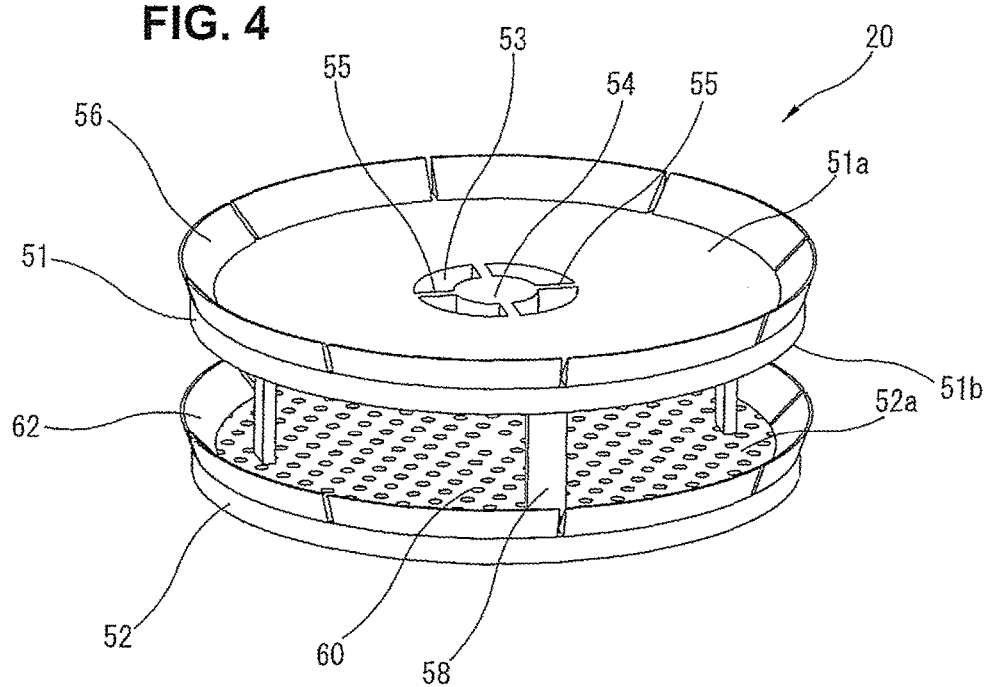
FIG. 4 is a perspective view illustrating a first partition wall and a second partition wall, constructing a charge-gas conversion-and-diffusion mechanism installed in the canister of the first embodiment.

Details of the charge-gas conversion-and-diffusion mechanism 20 of the first embodiment are hereunder described in reference to FIGS. 3-4.

Charge-gas conversion-and-diffusion mechanism 20 is constructed by a first partition wall 51 positioned along a plane perpendicular to the center line L (the axis) of main body 3 and a second partition wall 52 positioned along a plane perpendicular to the center line L. The first partition wall 51 is made of a synthetic resin material and formed into a disk shape. The first partition wall 51 has an outside diameter conformable to the inside diameter of the large-diameter part 3a. An orifice 53 is formed at the central section of the first partition wall 51. The orifice 53 is formed into a substantially annular shape with a central circular land 54. Also, the orifice 53 is configured to have an equivalent diameter (in other words, a nominal diameter) substantially equivalent to the diameter of an inlet 13a of charge port 13. The land 54 is connected to the circumference of the orifice 53 through a plurality of thin-walled bridges 55, for instance, four bridges 55 in the shown embodiment (see FIG. 4). The first partition wall 51 has a first surface 51a facing the first cylindrical portion 26 and a second surface 51b facing the side of drain port 7. Also, the first partition wall 51 has a seal lip 56 outwardly flaring or outwardly tapered from the outer peripheral edge of the first surface 51a. The seal lip 56 is divided into a plurality of lip pieces by means of a plurality of slits. The circumferentially-extending outermost edges of respective lip pieces of seal lip 56 are kept in contact with the inner peripheral surface of the large-diameter part 3a. A plurality of elongated spacers 58 (for instance, four spacers 58 in the shown embodiment) are interleaved between the second surface 51b of the first partition wall 51 and the second partition wall 52, and positioned closer to the circumferences of the axially opposed two partition walls 51-52. The longitudinal length of each of spacers 58 is dimensioned or set such that the first partition wall 51 and the second partition wall 52 are axially spaced apart from each other by a prescribed axial distance. In the shown embodiment, the four spacers 58 are formed integral with the second surface 51b of the first partition wall 51. In lieu thereof, these spaces 58 may be structured separately from the first partition wall 51.

In a similar manner to the first partition wall 51, the second partition wall 52 is made of a synthetic resin material and formed into a disk shape. The second partition wall 52 has an outside diameter conformable to that of the first partition wall 51. The second partition wall 52 differs from the first partition wall 51 in that the second partition wall 52 is configured as a perforated plate (or a punched plate). That is, the second partition wall 52 has a number of communication holes 60 formed as elongated openings formed parallel to the center line L (the axis) of main body 3 and distributed uniformly around the entire surface of the second partition wall 52. The hole diameter of each of numerous communication holes 60 of the second partition wall 52 is dimensioned or set to be less than the hole diameter (the orifice area) of each of orifices 43 of the first flange 21. Additionally, the number of small elongated communication holes 60 of the second partition wall 52 is set to be greater than that of the small circular orifices 43 of the first flange 21. In a similar manner to the seal lip 56 of the first partition wall 51, the second partition wall 52 has a seal lip 62 outwardly flaring or outwardly tapered from the outer peripheral edge of a first surface 52a of the second partition wall 52, facing the second surface 51b of the first partition wall 51. The seal lip 62 is divided into a plurality of lip pieces by means of a plurality of slits. The circumferentially-extending outermost edges of respective lip pieces of seal lip 62 are kept in contact with the inner peripheral surface of the large-diameter part 3a.

With the first partition wall 51 and the second partition wall 52 constructed as discussed previously, as shown in FIG. 3, in order to ensure a required volume (i.e., a required diffusion capacity) for a second diffusion chamber 64, the axially opposed partition walls 51-52 are installed or positioned in the large-diameter part 3a such that the first partition wall 51 and the second partition wall 52 are axially spaced apart from each other by the prescribed axial distance by means of the spacers 58. That is, the first partition wall 51 is arranged parallel to the first flange 21. Additionally, the first partition wall 51 is arranged or positioned close to the downstream end 26a (the top end) of the first cylindrical portion 26 such that the orifice 53 is positioned on the center line L (the axis) of main body 3. By the way, an appropriate clearance space is defined between the first partition wall 51 and the downstream end 26a of the first cylindrical portion 26, fully taking account of the gas flow described later. Also, the second partition wall 52 is arranged parallel to the first partition wall 51 by means of the spacers 58. Additionally, the second partition wall 52 is positioned to be axially spaced toward the side of drain port 7 away from the first partition wall 51 by a prescribed axial length (a prescribed axial distance in the longitudinal direction of the main body 3 of the case 2). In this manner, the adsorption material chamber 18 is divided into two sections, that is, the upstream-side adsorption material chamber 18a (on the side of charge port 13 and purge port 12) and the downstream-side adsorption material chamber 18b (on the side of drain port 7) by means of the first partition wall 51 and the second partition wall 52.

As best seen in FIG. 3, the second diffusion chamber 64 is defined between the first partition wall 51 and the second partition wall 52. The second diffusion chamber 64 is not charged with the adsorption material 19. In other words, an internal space not charged with an adsorption material is defined between the first partition wall 51 and the second partition wall 52. For instance, the longitudinal length of the second diffusion chamber 64, that is, the prescribed axially-spaced distance between the first partition wall 51 and the second partition wall 52 is dimensioned or set to approximately three times the diameter of the inlet 13a of charge port 13.

With the previously-discussed configuration of the canister of the first embodiment, charge gas, flowing through the circumferentially equidistant-spaced orifices 43 formed in the first flange 21 into the upstream-side adsorption material chamber 18a, tends to converge toward the central section of the upstream-side adsorption material chamber 18a, and then flows through the orifice 53 of the first partition wall 51 into the second diffusion chamber 64. Within the second diffusion chamber 64, the charge gas tends to expand radially outward from the orifice 53. Then the charge gas flows through numerous small elongated communication holes 60 into the downstream-side adsorption material chamber 18b.

On the side of the upstream-side adsorption material chamber 18a, charging tends to advance such that the charge gas, introduced through the circumferentially equidistant-spaced orifices 43 formed in the first flange 21 and arranged on the single concentric circle into the upstream-side adsorption material chamber 18a, tends to converge radially inward (that is, toward the orifice 53 of the first partition wall 51). As a result of this, it is possible to attain a substantially uniform adsorption-amount distribution in the radial direction of the upstream-side adsorption material chamber 18a. On the other hand, on the side of the downstream-side adsorption material chamber 18b, charging tends to advance around the entire surface of the cross section of the adsorption material chamber 18 (exactly, the downstream-side adsorption material chamber 18b) after the charge gas has been re-diffused within the second diffusion chamber 64. As a result of this, it is possible to attain a substantially uniform adsorption-amount distribution in the radial direction of the downstream-side adsorption material chamber 18b.

Therefore, in the canister of the first embodiment, it is possible to achieve optimal charging of gas (charge gas) containing evaporative fuel, while effectively utilizing all of adsorption material 19 (granular activated carbon particles) installed in the adsorption material chamber 18 (i.e., the upstream-side adsorption material chamber 18a as well as the downstream-side adsorption material chamber 18b).

Figure 5:
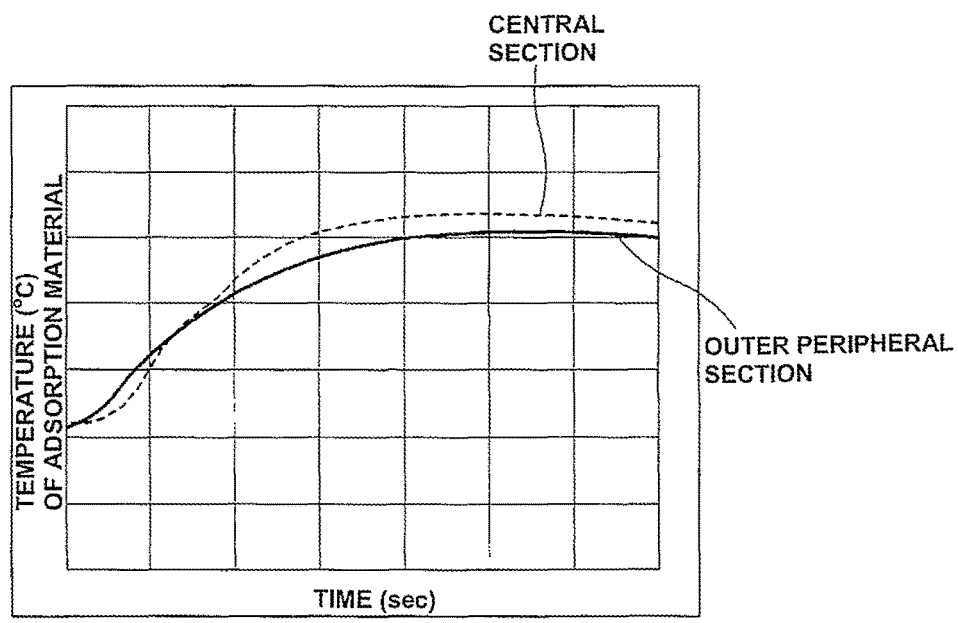
FIG. 5 is an adsorption-material temperature versus time characteristic curve illustrating an adsorption state of fuel components in the canister of the first embodiment.

Referring now to FIG. 5, there is shown the adsorption-material temperature versus time characteristic curve, illustrating a change in temperature of adsorption material 19 in a cross section near the downstream end 26a (the top end) of the first cylindrical portion 26 with time, eventually, an adsorption state of fuel components in the canister of the first embodiment. During a phase of adsorption corresponding to exothermic reaction, a temperature of adsorption material 19 tends to rise in accordance with an adsorption amount of fuel components. That is, there is a correlation between the temperature of adsorption material 19 and the adsorption amount of fuel components within the canister. Therefore, regarding temperatures of adsorption material 19 in the cross section near the downstream end 26a (the top end) of the first cylindrical portion 26, (i) a temperature of adsorption material 19 measured at the central section (indicated by the broken line in FIG. 5) of the upstream-side adsorption material chamber 18a and (ii) a temperature of adsorption material 19 measured at the outer peripheral section (indicated by the solid line in FIG. 5) of the upstream-side adsorption material chamber 18a are plotted in the characteristic curve of FIG. 5. As appreciated from the result of comparison between a change in adsorption-material temperature of the central section (indicated by the broken line) and a change in adsorption-material temperature of the outer peripheral section (indicated by the solid line), in the canister of the first embodiment, an advance in adsorption of the central section of the upstream-side adsorption material chamber 18a and an advance in adsorption of the outer peripheral section of the upstream-side adsorption material chamber 18a are almost the same. That is, the canister of the first embodiment enables a substantially uniform adsorption-amount distribution even radially in cross section perpendicular to the longitudinal charge-gas flow stream.

The canister of the second embodiment is hereunder described in detail in reference to FIG. 6. In explaining the second embodiment, for the purpose of simplification of the disclosure, the same reference signs used to designate elements in the first embodiment will be applied to the corresponding elements used in the second embodiment, while detailed description of the same reference signs will be omitted because the above description thereon seems to be self-explanatory.

The canister of the second embodiment slightly differs from that of the firs embodiment in that a charge-gas conversion-and-diffusion mechanism 120 of the second embodiment is constructed by a disk-shaped partition wall 151 and a cylindrical gas-permeable member 152. The partition wall 151 of charge-gas conversion-and-diffusion mechanism 120 of the second embodiment is basically similar to the first partition wall 51 of charge-gas conversion-and-diffusion mechanism 20 of the first embodiment in construction. The partition wall 151 has an orifice 153 formed at its central section, and a seal lip 156 outwardly flaring or outwardly tapered from the outer peripheral edge of a first surface 151a of partition wall 151 facing the first cylindrical portion 26. The orifice 153 is formed into a substantially annular shape with a central circular land 154. However, the partition wall 151 of the second embodiment somewhat differs from the first partition wall 51 of the first embodiment, in that the partition wall 151 of the second embodiment does not have any spacers 58.

The gas-permeable member 152 is made of an open cell porous material, such as open cell polyurethane foam, that permits charge-gas flow. Also, the gas-permeable member 152 has a sufficient thickness (i.e., a sufficient longitudinal length in the longitudinal direction of case 2) to satisfactorily diffuse the introduced charge gas.

The gas-permeable member 152 designed or configured as set out above, is overlaid on a second surface 151b of partition wall 151, facing the side of drain port 7, and positioned in the large-diameter part 3a of main body 3. That is to say, the charge-gas conversion-and-diffusion mechanism 120 of the second embodiment somewhat differs from the charge-gas conversion-and-diffusion mechanism 20 of the first embodiment, in that in the second embodiment an internal space, corresponding to the second diffusion chamber 64, is not defined between the partition wall 151 and the gas-permeable member 152.

With the previously-discussed configuration of the canister of the second embodiment, charge gas, introduced into the upstream-side adsorption material chamber 18a, tends to converge toward the central section of the upstream-side adsorption material chamber 18a, and then flows through the orifice 153 of the partition wall 151 into the gas-permeable member 152. The charge gas spreads uniformly throughout the gas-permeable member 152 by means of numerous pores in gas-permeable member 152, and thereafter the uniformly spread charge gas flows into the downstream-side adsorption material chamber 18b. In this manner, the gas-permeable member 152 of the second embodiment can provide the same function as the second partition wall 52 and the second diffusion chamber 64 of the first embodiment. Hence, in a similar manner to the first embodiment, in the canister of the second embodiment it is possible to achieve optimal charging of gas (charge gas) containing evaporative fuel, while effectively utilizing all of adsorption material 19 (granular activated carbon particles) installed in the adsorption material chamber 18 (i.e., the upstream-side adsorption material chamber 18a as well as the downstream-side adsorption material chamber 18b).

By the way, in the respective embodiments, the orifice 53 of the first partition wall 51 and the orifice 153 of the partition wall 151 are both formed into a substantially annular shape. In lieu thereof, each of the orifice 53 of the first partition wall 51 and the orifice 153 of the partition wall 151 may be formed as a single circular flow-constricting orifice.

In the shown embodiments, the main body (housing) 3 of canister 1 is formed into a cylindrical hollow shape having a complete circular cross section. In lieu thereof, the main body (housing) 3 of canister 1 may be formed into a rectangular cylindrical shape having a rectangular cross section.

The entire contents of Japanese Patent Application No. 2015-245736 (filed Dec. 17, 2015) are incorporated herein by reference.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. A canister comprising:
(a) a cylindrically shaped case whose inside is charged with adsorption material;
(b) a charge port and a purge port both located at a first axial end portion of the case;
(c) a drain port located at a second axial end portion of the case, the second axial end portion being opposite to the first axial end portion in a longitudinal direction of the case; and
(d) an annularly shaped flange provided at the first axial end portion of the case for partitioning an outer peripheral section of one axial end of an adsorption material chamber defined in the case, the flange having
  (i) a first cylindrical portion configured to protrude from an inner periphery of the flange toward the second axial end portion and concentric with the case for defining a specified space corresponding to a center section of the case and communicating with the purge port,
  (ii) a second cylindrical portion configured to extend from the inner periphery of the flange toward the first axial end portion and concentric with the case for defining an annular diffusion chamber communicating with the charge port in cooperation with the case, and
  (iii) a plurality of orifices formed in the flange for communicating the adsorption material chamber with the annular diffusion chamber through the plurality of orifices;
(e) a first partition wall installed in the adsorption material chamber and positioned close to a top end of the first cylindrical portion and having an orifice formed at a center section of the first partition wall; and
(f) a second partition wall positioned to be axially spaced apart from the first partition wall toward the second axial end portion and having a plurality of communication holes formed around an entire surface of the second partition wall, the second partition wall being structured to cooperate with the first partition wall such that a second diffusion chamber not charged with an adsorption material is defined between the first partition wall and the second partition wall,
wherein the orifice of the first partition wall is formed into a substantially annular shape.

2. The canister as recited in claim 1, wherein:
the case is configured to have a small-diameter part on a side of the drain port and a large-diameter part on a side of the charge port, and the first partition wall and the second partition wall are both positioned in the large-diameter part of the case.

3. A canister, comprising:
(a) a cylindrically shaped case whose inside is charged with adsorption material;
(b) a charge port and a purge port both located at a first axial end portion of the case;
(c) a drain port located at a second axial end portion of the case, the second axial end portion being opposite to the first axial end portion in a longitudinal direction of the case; and
(d) an annularly shaped flange provided at the first axial end portion of the case for partitioning an outer peripheral section of one axial end of an adsorption material chamber defined in the case, the flange having
  (i) a first cylindrical portion configured to protrude from an inner periphery of the flange toward the second axial end portion and concentric with the case for defining a specified space corresponding to a center section of the case and communicating with the purge port,
  (ii) a second cylindrical portion configured to extend from the inner periphery of the flange toward the first axial end portion and concentric with the case for defining an annular diffusion chamber communicating with the charge port in cooperation with the case, and
  (iii) a plurality of orifices formed in the flange for communicating the adsorption material chamber with the annular diffusion chamber through the plurality of orifices;
(e) a partition wall installed in the adsorption material chamber and positioned close to a top end of the first cylindrical portion and having an orifice formed at a center section of the partition wall; and
(f) a gas-permeable member overlaid on a surface of the partition wall, facing the second axial end portion, the gas-permeable member having a prescribed longitudinal length in the longitudinal direction of the case, wherein the orifice of the partition wall is formed into a substantially annular shape.

4. A canister, comprising:
(a) a cylindrically shaped case whose inside is charged with adsorption material;
(b) a charge port and a purge port both located at a first axial end portion of the case;
(c) a drain port located at a second axial end portion of the case, the second axial end portion being opposite to the first axial end portion in a longitudinal direction of the case; and
(d) an annularly shaped flange provided at the first axial end portion of the case and structured to partition an outer peripheral section of one axial end of an adsorption material chamber defined in the case, the flange having
  (i) a first cylindrical portion configured to protrude from an inner periphery of the flange toward the second axial end portion and concentric with the case to define a specified space corresponding to a center section of the case and communicating with the purge port;
  (ii) a second cylindrical portion configured to extend from the inner periphery of the flange toward the first axial end portion and concentric with the case to define an annular diffusion chamber communicating with the charge port in cooperation with the case; and
  (iii) a plurality of orifices formed in the flange and arranged to communicate the adsorption material chamber with the annular diffusion chamber through the plurality of orifices;
(e) at least one partition wall installed in the adsorption material chamber and positioned proximate to a top end of the first cylindrical portion, the top end being a downstream end of the first cylindrical portion, and wherein a clearance exists between the at least one partition wall and the downstream end of the first cylindrical portion; and
(f) an orifice formed at a center section of the at least one partition wall, the orifice being positioned so as to coincide with a center line that is an axis of a body of the case,
wherein the orifice of the at least one partition wall is formed into a substantially annular shape.

5. The canister of claim 4, wherein:
the at least one partition wall comprises a first partition wall and a second partition wall;
the orifice is formed at a center section of the first partition wall; and
the second partition wall is axially spaced apart from the first partition wall toward the second axial end portion and has a plurality of communication holes formed around an entire surface of the second partition wall, the second partition wall being structured to cooperate with the first partition wall such that a second diffusion chamber not charged with an adsorption material is defined between the first partition wall and the second partition wall.

6. The canister of claim 4, further comprising:
a gas-permeable member overlaid on a surface of the at least one partition wall, facing the second axial end portion, the gas-permeable member having a prescribed longitudinal length in the longitudinal direction of the case.

* * * * *